J. ARMSTRONG, Jr.
Corn-Planter.

No. 35,914. Patented July 22, 1862.

WITNESSES:

INVENTOR:
James Armstrong Jr.
per Munn & Co.
Attorneys

UNITED STATES PATENT OFFICE.

JAMES ARMSTRONG, JR., OF ELMIRA, ILLINOIS

IMPROVEMENT IN CORN-PLANTERS.

Specification forming part of Letters Patent No. 35,914, dated July 22, 1862.

*To all whom it may concern:*

Be it known that I, JAMES ARMSTRONG, Jr., of Elmira, in the county of Stark and State of Illinois, have invented a new and Improved Corn-Planter; and I do hereby declare that the following is a full, clear, and exact description of the same, reference being had to the accompanying drawings, making a part of this specification, in which—

Figure 1:
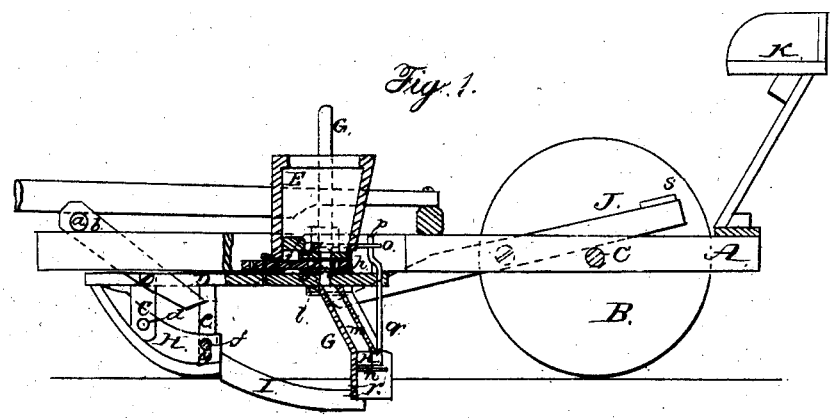
Figure 2:
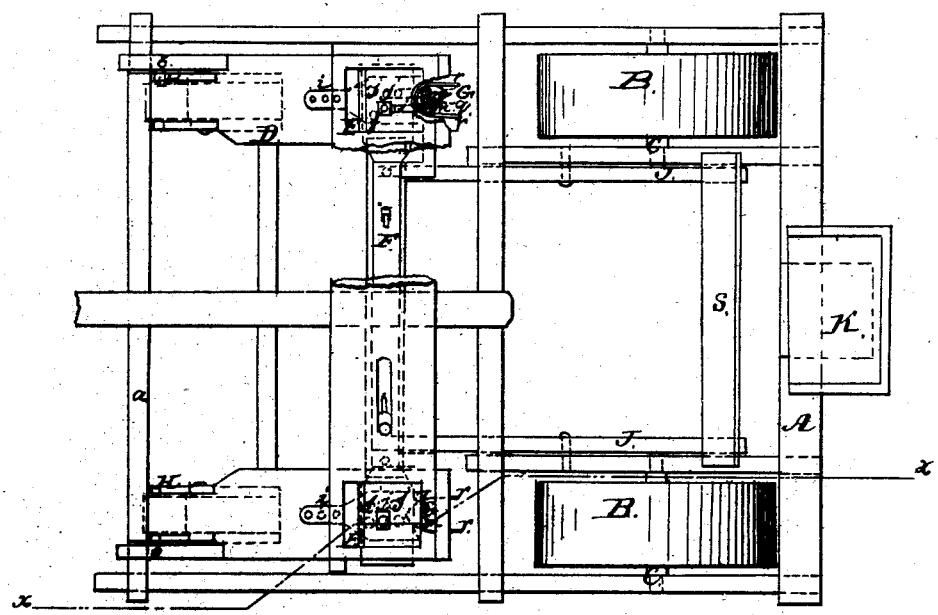

Figure 1 represents a longitudinal vertical section of my invention, taken in the plane indicated by the line $x$ $x$, Fig. 2. Fig. 2 is a plan or top view of the same, partly in section.

Similar letters of reference in both views denote like parts.

This invention consists in the arrangement of an oscillating valve working under a twin tube and between the openings of said tube and a stationary platform in such a manner that by said valve the seed dropping down through one branch of the twin tube is retained on the platform, while at the same time the seed deposited on said platform through the other branch of the twin tube is swept off and deposited in the furrow.

It consists, further, in the arrangement of hinged adjustable runners, in combination with inclined cutters and shoes, which serve to open the furrows in such a manner that the depth of the furrows, and consequently the depth of planting, can be regulated at pleasure.

To enable those skilled in the art to make and use my invention, I will proceed to describe its construction and operation with reference to the drawings.

The frame A, which supports the working parts of my seed-planter, rests on two wheels, B, each of which is provided with a separate axle, C. From the front cross-bar, $a$, of the frame A a secondary frame, D, is suspended by means of arms $b$, which are attached to said cross-bar in such a manner that said secondary bar rises and falls freely. This frame carries the seed-distributing mechanism—viz., the hoppers E, and the seed-slide F, and discharge-tubes G, and also the runners H and cutters I. The runners H are attached to standards $c$ by means of pivots $d$, and their rear ends are secured to the upright shanks $e$ of the cutters I by means of screws $f$. These screws pass through slots $g$, so that the runners can be raised or lowered at pleasure. The cutters I are rigidly attached to the frame D, their front ends being turned up so as to form the shanks $e$, which are fastened to the frame D, and their rear ends being firmly screwed to the discharge-tubes G. The runners H are intended to pass over the ground and the cutters open the furrows, and it is obvious that by raising the rear ends of the runners by means of the slots $g$ and screws $f$ the depth of the furrows is increased, and by depressing the rear ends of the runners the depth of the furrows is decreased, and consequently by these means the depth of planting is regulated.

The seed is discharged from the hoppers E by the action of the slide F, which passes through both hoppers, and to which a reciprocating motion is imparted by the hand-lever G. The slide is provided with two mortises, $h$, passing through it in a transverse direction near to its ends in the interior of the hoppers E, and through these mortises secondary slides $i$ pass, which are provided with a series of seed-cells, $j$, of different size. By moving the secondary slides $i$ in a transverse direction either set of these seed-cells may be brought under the centers of the hoppers, and the seed is admitted to the same through apertures $k$ in the upper parts of the slide F, and in moving the slide the seed contained in the seed-cells is discharged through apertures $l$ in the lower part of the slide. By the different sizes of the seed-cells in the secondary slides $i$ the quantity of seed discharged from the hopper by every stroke of the slide F is regulated. From the slide F the seed is discharged through the tubes G, each of which is provided with two channels, $m$, and for each double stroke of the slide the seed is alternately deposited in one and then the other channel. From these channels the seed drops down upon the platform $n$, where it is retained by a double-winged valve H' until, by the return-stroke of the slide F, the position of the valve is changed, thereby sweeping the seed previously deposited on the platform $n$ down into the furrow and opening at the same time the second channel of the tube for a fresh deposit of seed on the platform. The valve H' is operated by an arm, $o$, which extends from the seed-slide F, and which catches over the crank $p$ at the upper extremity of the valve-stem $q$, so that the motion of said valve depends entirely upon the motion of the slide, and it (the valve) moves between the wings *r* of the shoes I, which form the lower extremities of the discharge-tubes G. The wings *r* prevent the clods from mingling with the newly deposited seed. The wheels B, in passing over the furrows in which the seed has been deposited, solidify the ground. A lever, J, which is pivoted to the main frame A, serves to throw the secondary frame D, with the seed-distributing mechanism, out of the ground whenever it is desired. This lever is operated by a cross-bar, *s*, situated in front of the driver's seat K, so that the driver, by getting up from his seat, can conveniently throw his weight on the same, whereby the secondary frame is raised and the cutters are thrown out of the ground.

Having thus fully described my invention, what I claim as new, and desire to secure by Letters Patent, is—

1. The arrangement of the oscillating valve H' and platform *n*, in combination with the two channels *m* of the discharge-tube G, and with the seed-distributing mechanism, constructed and operating as and for the purpose shown and described.

2. The arrangement of the hinged adjustable runners H, secondary frame D, and lever J, in combination with the cutters I and shoes I', constructed and operating as and for the purpose specified.

JAMES ARMSTRONG, Jr.

Witnesses:
C. P. BUSWELL,
HENRY STRONG.